United States Patent [19]

Bindman

[11] 4,283,037
[45] Aug. 11, 1981

[54] TELEPHONE DISPLAY DEVICE

[75] Inventor: Stanley Bindman, North Bellmore, N.Y.

[73] Assignee: Business Concepts Marketing Corporation, Island Park, N.Y.

[21] Appl. No.: 947,614

[22] Filed: Oct. 2, 1978

[51] Int. Cl.³ .............................................. H04M 1/21
[52] U.S. Cl. ............................... 248/441 B; 248/221.3
[58] Field of Search ............... 248/221.3, 221.4, 441 B

[56] References Cited

U.S. PATENT DOCUMENTS

| 1,703,090 | 2/1929 | Ashfield | 248/221.3 |
| 2,580,819 | 1/1952 | Nagy | 248/441 B X |
| 2,693,509 | 11/1954 | Selee | 248/441 B X |
| 3,640,497 | 2/1972 | Waki | 248/221.4 X |
| 3,888,355 | 6/1975 | Garrison | 248/221.3 X |
| 4,004,112 | 1/1977 | Einstein | 248/441 B X |
| 4,148,454 | 4/1979 | Carlson | 248/222.1 |

FOREIGN PATENT DOCUMENTS 480958  2/1952  Canada ................................ 248/441 B Primary Examiner—William H. Schultz
Attorney, Agent, or Firm—Gerald Levy

[57] ABSTRACT

A telephone display device comprises a pair of spaced apart legs, an easel mounted to the tops of the legs and a support member extending transversely across the bottom of the legs. The support member is proportioned to fit within the hand grip opening at the back of a telephone set and contains resiliently biased lugs to lockingly engage surfaces of the telephone. The easel extends above the telephone receiver when the display stand is in position and includes spaced lugs for capturing the binding of an information containing booklet.

3 Claims, 4 Drawing Figures

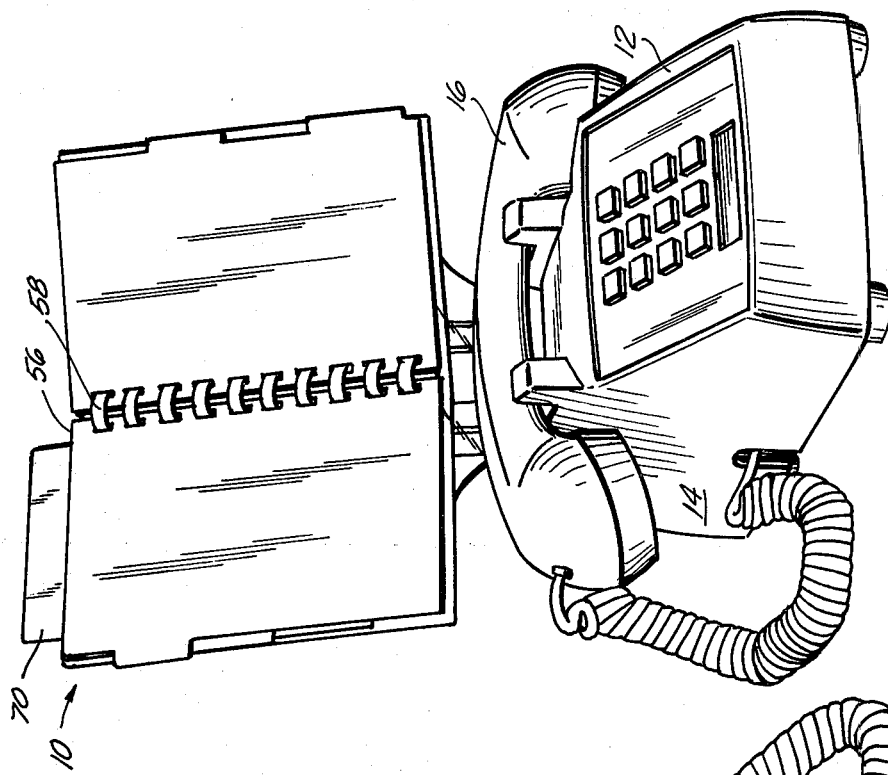
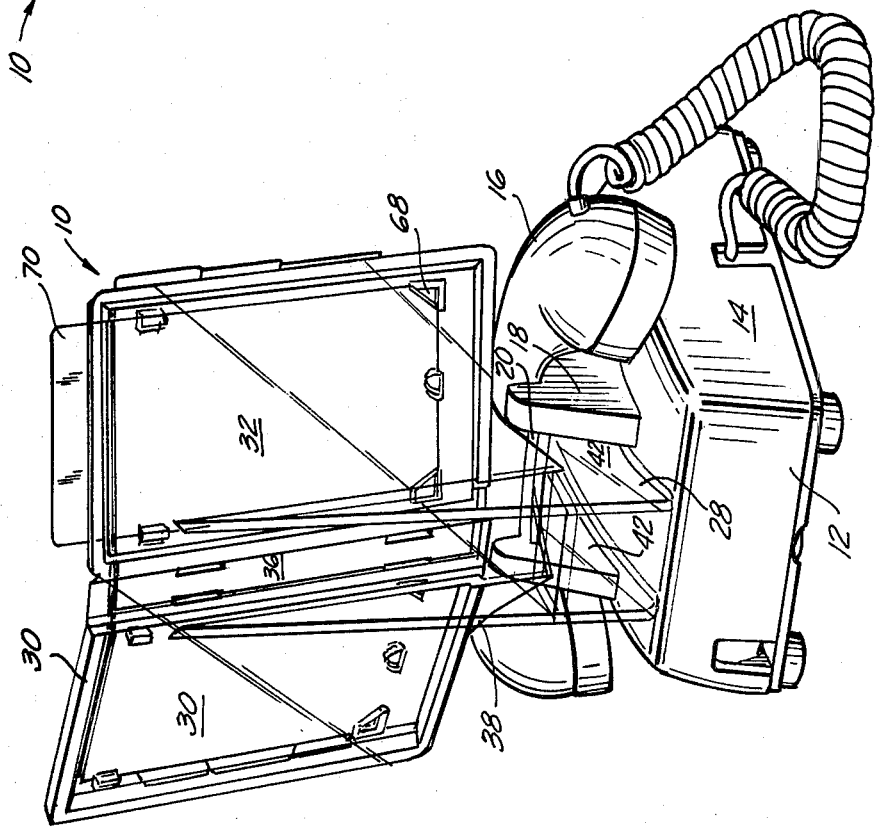

TELEPHONE DISPLAY DEVICE

BACKGROUND OF THE INVENTION

The present invention relates to display devices and in particular to a display stand adapted to be secured to a telephone set.

Since the telephone set in a hotel or motel room is in a location which is bound to attract the attention of the room's occupant, it presents a very convenient location for positioning information for the guest. Such information may, for example, comprise instructions for the use of the telephone, services and facilities available to the guest, advertisements of merchants, listings of activities and the like. It is desirable to display such information in as permanent and as aesthetically pleasing a manner as possible, while, at the same time, maintaining a degree of security both over the display device and information. In addition, since some of the information may change from time to time, the display device must be such as to enable the hotel staff to make changes with relative ease. Thus, the display must be capable of holding a booklet or similar information medium firmly in position yet in a manner whereby the information is readily accessible to the guest. In addition, the display should be such as to permit the hotel staff to change the information with relative ease as required yet make it difficult for a guest to walk off with the information. Finally, the display itself should be affixed to the telephone set in a manner which makes it difficult for a guest to remove yet which may be attached with ease.

Heretofore, various devices have been suggested which, in order to meet some of the above criteria, sacrifice others. In one common device, a slide is affixed to the bottom of the telephone set. The information in the form of cards or a booklet is mounted to the slide and is normally stored beneath the telephone set out of view of the guest.

In view of the above, it is the principal object of the present invention to provide a telephone display stand which meets all of the above criteria.

A further object is to provide such a display stand which may readily and simply be installed on a telephone set without requiring the use of any tools but which, once in position, requires some skill to remove.

A still further object is to provide a display stand which is attractive yet one which may be manufactured relatively inexpensively.

SUMMARY OF THE INVENTION

The above and other beneficial objects and advantages are attained in accordance with the present invention by providing a display stand for use with a conventional telephone set. Such telephone sets have a cradle with a top surface for supporting a telephone receiver and a bottom surface defining the top of a hand grip opening extending toward the front of the telephone from the rear. The cradle bottom surface includes a downwardly extending lip at the top rear of the opening which is normally rounded off to protect the user's fingers. The stand comprises a base in the form of a pair of spaced apart legs having an easel attached to the top thereof. A supporting member extends forwardly from the bottom of the legs. The support member is proportioned to fit within the hand grip opening of the telephone and includes surfaces thereon for lockingly engaging surfaces of the telephone set which define the opening. The support member surfaces include at least one lug which is spring biased to lock in position behind the telephone lip when the support member is positioned within the hand grip opening. The lug has a top surface defining a cam so that the spring bias may be overcome by the lip as the support member is inserted into the opening.

The easel includes means for engaging the binding of a spiral bound information containing booklet. The means include spaced apart lugs which engage the spiral binding in a tight friction fit.

BRIEF DESCRIPTION OF THE DRAWINGS

The present invention is depicted in the accompanying drawings wherein:

FIG. 1 is a rear perspective environmental view of a display stand in accordance with the present invention in operative position on a conventional telephone set;

FIG. 2 is a front perspective environmental view;

DETAILED DESCRIPTION OF THE PREFERRED EMBODIMENT

Figure 3:
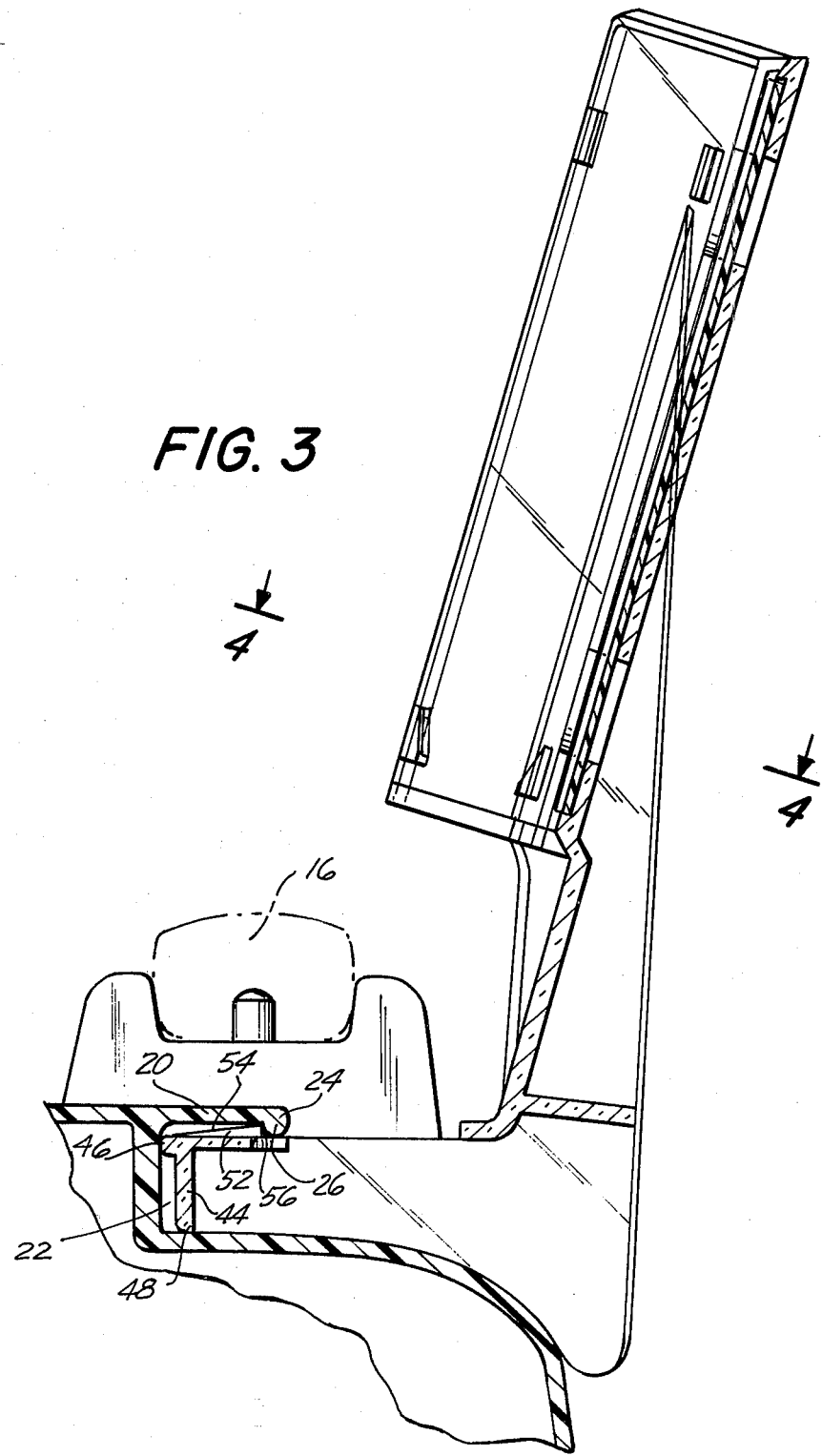
FIG. 3 is a fragmentary side elevational sectional view of the display stand; and, FIG. 4 is a sectional view along reference line 4—4 of FIG. 3.

Reference is now made to the drawings and to FIGS. 1 and 2 in particular wherein the display stand 10 of the present invention is shown in position on an associated telephone hand set 12. Telephone set 12 is of conventional design comprising a base 14 and receiver 16. Receiver 16 fits within surfaces defining a cradle 18. As shown in FIG. 3, the telephone receiver 16 is supported on the top surface 20 of the cradle. The bottom surface of the cradle defines the top of a hand grip opening generally designated by the numeral 22. This opening is provided on virtually all telephone sets and serves to enable the user to carry a telephone set from place to place.

The bottom surface of the cradle terminates at its rear edge 24 in a downwardly extending lip 26. This lip is generally rounded as shown and provides a blunt edge for contact with the user's hand. With the exception of the above, the remaining details of the telephone set 12 are immaterial to the present invention.

The display stand 10 comprises a base 28 defined by a pair of spaced apart legs 38 and 40 to which an easel 30 is mounted at the top thereof. The easel consits of two essentially side-by-side sections 32 and 34 separated by a spine 36. The spacing of the legs is on the order of two inches so as to fit within the hand grip opening. The legs are sufficiently long so that the entire easel extends above the telephone receiver when the display device is installed on a telephone.

A pair of arms 42 extend forwardly from the bottoms of legs 38 and 40. A support member comprising a transversely extending member 44 is secured at its sides to the spaced apart arms 42. The top and bottom edges 46 and 48 respectively of member 44 are spaced apart from each other a distance substantially equal to or somewhat less than the vertical dimension of hand grip opening 22 which is approximately 1⅛ inches. In this regard, the bottom surfaces of the arms are contoured to follow the curvature of the rear of the telephone as shown in FIG. 3.

In accordance with the present invention, a pair of spaced apart locking lugs 50 and 52 extend rearwardly from the top edge 46 of member 44. Each of the lugs 50 and 52 is cantilevered to the top edge 46. The top surface 54 of the lugs taper upwardly and rearwardly defining a camming surface to engage the rounded lip 26 on the telephone at the top of the opening. The rear face 56 of each lug drops off sharply as shown in FIG. 3.

In a successful practice of the present invention the display stand was formed of clear Lexan (a registered trademark of the General Electric Co.) with lugs 50 and 52 formed integral with member 44. This material is sufficiently resilient and flexible so that as the stand support portion is inserted within the hand grip opening, the lip 26 served to depress lugs 50 and 52 until the lugs pass freely under lip 26 at which time they snap up into the locking engagement depicted in FIG. 3.

Figure 4:
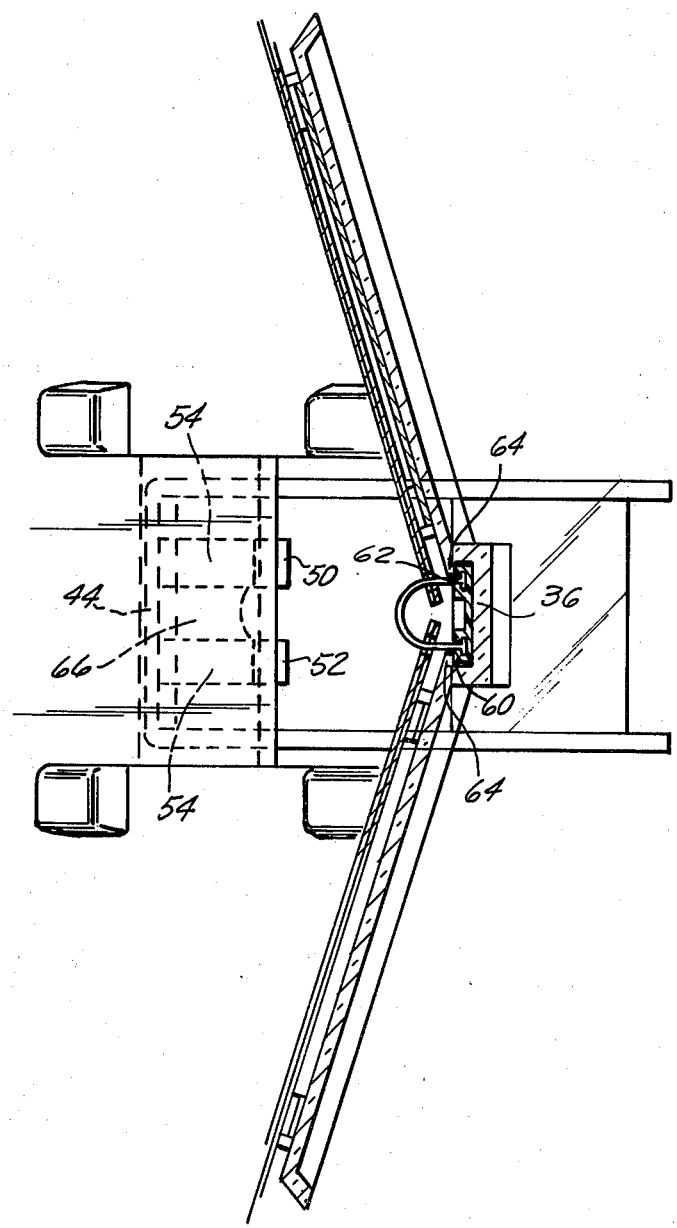

Referring to FIG. 2, it can be seen that the display stand 10 contains a booklet 56 the pages of which are bound together by a looped binding 58. As shown in FIG. 4, the binding 58 includes a spine 60 into which each loop 62 of the binding is locked in position. In accordance with the present invention, spaced locking lugs 64 are provided extending longitudinally along opposite sides of the display stand spine 36. The lugs serve to tightly engage the booklet spine and thereby capture the booklet in position. Support brackets 68 are provided on the easel section to engage the covers of booklet 56 and hold it in position. These brackets may also be used to engage a card 70 which may, for example, contain telephone dialing information or other special information or instructions.

An important feature of the present invention resides in the fact that lugs 50 and 52 are spaced apart from each other and joined by a common section 66 which extends from member 44. As previously stated, the display stand may be locked in position by merely inserting it into the telephone set hand grip opening until the lugs snap into place. On occasion, an authorized person may desire to remove the display stand. This may be accomplished by inserting a screwdriver or the like over section 66 and applying a downward pressure. This will cause the lugs 50 and 52 to move downwardly until they clear the lip of the telephone set opening. To this end, the spacing of section 66 is such as to accommodate the head of a screwdriver.

Another feature of the present invention is the fact that support legs 38 and 40 are spaced apart from each other and that the arms 42 extend forwardly from the lower portion of these legs. Thus, even when the display stand is in position, the hand grip opening may still effectively be used for its intended purpose, namely to enable one to lift and carry the telephone set.

Thus, in accordance with the above, the aforementioned objectives have been effectively attained.

Having thus described the invention, what is claimed is:

1. A display stand for use with a telephone set of the type having a cradle with a top surface for supporting a telephone receiver and bottom surface defining the top of a hand grip opening extending toward the front of the telephone from the rear, said cradle bottom surface including a downwardly extending lip at the top rear of said opening, said stand comprising: a pair of spaced legs, an easel supported to the upper portions of said legs, a supporting member extending forwardly from the lower portion of said legs, said member being proportioned to fit within said hand grip opening and including surfaces thereon for lockingly engaging surfaces of said telephone set defining said opening; said supporting member extending transversely between said legs and including a top edge, and at least one locking lug secured to said supporting member top edge and biased to extend upwardly beyond said top edge to engage said telephone opening lip when said support member is positioned within said telephone opening, said locking lug having a top camming surface adapted to engage said downwardly extending lip.

2. The display stand in accordance with claim 1 wherein said locking lug is cantilevered rearwardly from said front surface top edge.

3. The display stand in accordance with claim 1 comprising a pair of locking lugs spaced apart from each other.

* * * * *